March 19, 1974     R. H. WRIGHT     3,798,318
METHODS AND COMPOSITIONS FOR SELECTIVELY
ATTRACTING YELLOW-JACKET WASPS
Original Filed Jan. 7, 1970

INVENTOR

ROBERT H. WRIGHT

BY

*Fetherstonhaugh & Co.*

ATTORNEYS

United States Patent Office 3,798,318
Patented Mar. 19, 1974

3,798,318
METHODS AND COMPOSITIONS FOR SELECTIVELY ATTRACTING YELLOW-JACKET WASPS
Robert H. Wright, Vancouver, British Columbia, Canada, assignor to British Columbia Research Council, Vancouver, British Columbia, Canada
Continuation of abandoned application Ser. No. 1,140, Jan. 7, 1970. This application July 12, 1972, Ser. No. 270,989
Int. Cl. A01n 17/14
U.S. Cl. 424—84                2 Claims

ABSTRACT OF THE DISCLOSURE

There is disclosed improvements in the methods of selectively attracting yellow-jacket wasps and compositions for this purpose. A composition comprising any one or any combination of normal pentyl pentanoate, normal butyl benzoate, or dimethyl benzyl carbinyl acetate is placed in a trap and exposed to the atmosphere to attract the wasps.

---

This application is a continuation of S.N. 1,140, filed, January 7, 1970, now abandoned.

BACKGROUND OF THE INVENTION

This invention relates to methods and compositions for attracting yellow-jacket wasps without attracting bees, and other insects that may serve useful purposes.

Other compounds have been used in efforts to attract yellow-jacket wasps, but they are often too expensive for the purpose or too difficult to prepare chemically. Of the known compounds, 2,4-hexadienyl butyrate and a series of esters of aliphatic acids exhibiting unsaturation in the alpha position have been considered to be about the most effective. However, these have chemically unsaturated bonds, and the compounds indicate the existence of geometrically isomeric forms which may be of unequal attractiveness. Hence the products obtained by the usual methods of chemical synthesis would often be contaminated or diluted with isomeric forms of little or no value as attractants. Thus, in addition to the greater expense of producing this type of unsaturated compound, additional cost would be entailed in separating the active from the inactive isomers.

SUMMARY OF THE INVENTION

The invention includes the use of compositions for attracting wasps which are quite distinct from those of the prior art, and which do not have the above-outlined disadvantages. The present composition attracted enormous numbers of yellow-jacket wasps practically without attracting non-wasps. The art of attracting yellow-jacket wasps is greatly enhanced by the compositions and the methods employing these compositions to attract the wasps. These compositions have no chemically unsaturated bonds as is the case with the prior-art compositions mentioned above. The present compositions can be produced with considerably less expense than the known attractants, and as they are chemically saturated compounds, they can be produced without the trouble and additional cost of having to separate active from inactive isomers.

DESCRIPTION OF THE PREFERRED EMBODIMENTS

The improved art according to the present invention of selectively attracting yellow-jacket wasps comprises exposing to the atmosphere an attractant comprising any one or any combination of normal pentyl pentanoate, normal butyl benzoate, or dimethyl benzyl carbinyl acetate. If desired, the attractants can be combined with a compatible non-volatile solvent to retard evaporation at elevated temperatures. One such non-volatile solvent is triethyl citrate.

Normal butyl benzoate and normal pentyl pentanoate are highly effective attractants in all weather conditions when yellow-jacket wasps may be around. The dimethyl benzyl carbinyl acetate is an effective attractant mainly at higher temperatures, and, therefore, this compound is very useful at the higher temperatures when it is desired to prevent too rapid dissipation of the compound into the atmosphere.

In field tests, traps were separately baited with normal pentyl pentanoate, normal butyl benzoate, and dimethyl benzyl carbinyl acetate in accordance with this invention, and other traps were baited with 2,4-hexadienyl butyrate and other substances. The attractants of this invention were much more successful than the other substances, and the normal pentyl pentanoate and normal butyl benzoate exhibited a degree of attractancy usually better than that of 2,4-hexadienyl butyrate. Tests have shown that dimethyl benzyl carbinyl acetate performs best at higher temperatures because of its relatively low volatility. The attraction of the present compounds was highly specific, such as, for example, in a total field catch of more than 3,000 yellow-jacket wasps, there was only one non-wasp taken in any of the traps containing these compounds.

In extremely hot weather, dimethyl benzyl carbinyl acetate is more practical than the other two relatively more volatile substances. The wasp-attracting properties of these compounds may be utilized merely to trap the wasps, to draw them into contact with an adhesive or a drowning medium whereby they are immobilized or drowned, or the attractant may be used in combination with food or granules of porous material, such as expanded vermiculite, which have been impregnated with a larvicide so that the particles will be transported by the wasps into the nests and thus into contact with immature insects which would thus be killed in the pre-adult stage. A suitable poison for combination with the food or porous materials is "Paris green."

If it is desired to retard the evaporation of the compounds of this invention, and particularly for use in hot weather, they can be combined with a non-volatile solvent, such as triethyl citrate, for this purpose. This will retard evaporation without interfering with the effectiveness of the compounds as attractants.

Figure 1:
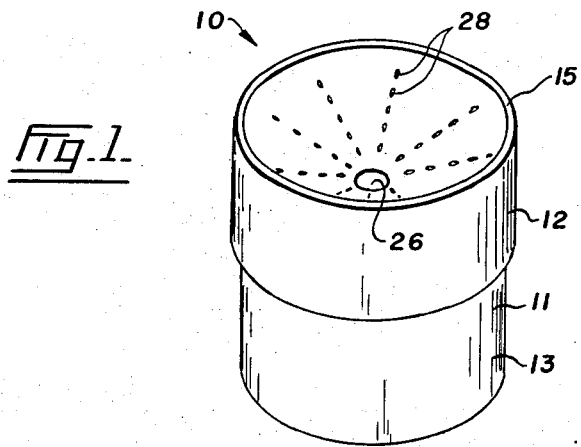
Fig. 1 is a perspective view of a trap used in this invention.

An example of a trap used in this invention is indicated at 10, and it consists of a container 11 having an upper section 12 removably fitting on a lower section 13. This lower section has a bottom 16 with a sleeve 17 projecting upwardly therefrom centrally thereof. This sleeve is adapted to receive the lower end of a bottle 20 which holds one or a combination of the wasp attractants normal pentyl pentanoate, normal butyl benzoate, or dimethyl benzyl carbinyl acetate. As the contents of this bottle have to be exposed to the atmosphere when the trap is in operation, bottle 20 is provided with a wick 21 which extends from near the bottom of the bottle upwardly through the cover 22 thereof. The wick is drawn part way out of the bottle when the trap is being used, as shown in FIG. 2, but when not in use, a cap 23, shown in broken lines, can be applied to the bottle.

Upper section 12 of container 11 is provided with a conical cover 25. This cover is actually in the form of an inverted truncated cone having an inlet opening 26 at the lower or small end thereof. Cover 25 preferably is perforated, and in this example, the cover is formed of a solid material having perforations 28 therein. If desired, the cover may be formed of screening or the like.

If it is desired merely to trap the wasps, there is no need of putting any liquid in the bottom of container 11. If it is desired to kill the wasps, a liquid 33 may be placed in the bottom section 13 of the container. Although a suitable poison can be used, it is preferable to use a soapy or oily water so the wasps are drowned. This eliminates the necessity of having to handle or use poisons. On the other hand, the wasps can be used as vehicles for killing wasp larvae in their nests, in which case a suitable carrier, such as expanded vermiculite, granulated fish meal, or the like, treated with the attractant and having incorporated into it a suitable poison, such as Paris green or chlordane, can be placed in a suitable holder.

Figure 2:
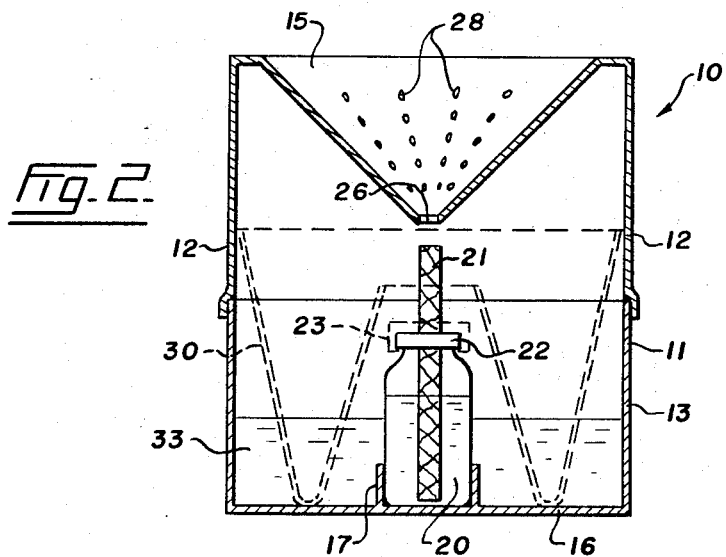
FIG. 2 is an enlarged vertical section through the trap of FIG. 1.

As an alternative, holder 30 having a relatively large sticky surface may be placed in container 11, this holder being shown in broken lines in FIG. 2. Wasps attracted into the trap, stick to this holder.

When it is desired to keep an area clear of wasps, one or more traps 10 are placed in the area, each one having a bottle 20 therein containing the selected attractant. The cap 23 is removed from each bottle 20 so that the attractant in wick 21 is exposed to the atmosphere. It is exposed not only to the interior of container 11 but to the atmosphere outside the container through opening 26 and perforations 28. It is desirable to position the upper end of the wick near opening 26 of the conical cover 25. Wasps that are attracted by the compound follow it to the source so that they move down the conical cover 25 and pass through opening 26. The wasps find it difficult to fly back through this opening. Thus, they are trapped in container 11, and if the latter has a drowning agent in the bottom thereof, the wasps are eventually drowned. The wasps can be removed as frequently as necessary by removing the upper section 12 from the lower section 13 of the container. On the other hand, if a carrier with a poison in it is placed near the trap, the wasps are attracted to the area, and can fly back to their nests carrying the poison carrier. This carrier may be such that it sticks to the wasps, or it may be carried by them as food. If sticky holder 30 is used instead of the drowning agent or the poison carrier, the wasps adhere to the holder and eventually die.

I claim:

1. The method of selectively attracting yellow-jacket wasps without attracting bees from an area inhabited by said wasps and said bees which comprises placing in a holder and exposing to the atmosphere an effective yellow-jacket attracting amount of an attractant comprising normal pentyl pentanoate.

2. The method as claimed in claim 1 in which the attractant is combined with triethyl citrate in sufficient quantity to retard evaporation at elevated temperaures.

References Cited

Chemical absracts, vol. 29 (1935), 6483.

Chemical Insect Attractants and Repellents, Dethier, The Blakiston Co., Philadelphia, Toronto (1947), pp. 86–88, 171, 133, 175–176, 179–181, 183–185 and 189.

Materials Tested as Insect Attractants, Beroza et al., USDA (1963), Agric. Res. Service, Agriculture Handbook #239, pp. 17–19, 21 and 225.

ALBERT T. MEYERS, Primary Examiner

F. E. WADDELL, Assistant Examiner